United States Patent
Yasuda et al.

(10) Patent No.: US 10,453,227 B2
(45) Date of Patent: Oct. 22, 2019

(54) MASS SPECTROMETRY DATA PROCESSING APPARATUS

(71) Applicant: SHIMADZU CORPORATION, Kyoto-shi, Kyoto (JP)

(72) Inventors: Hiroyuki Yasuda, Kyoto (JP); Yoshikatsu Umemura, Osaka (JP); Tetsuya Kageyama, Ibaraki (JP)

(73) Assignee: SHIMADZU CORPORATION, Kyoto-shi (JP)

(*) Notice: Subject to any disclaimer, the term of this patent is extended or adjusted under 35 U.S.C. 154(b) by 0 days.

(21) Appl. No.: 14/847,359

(22) Filed: Sep. 8, 2015

(65) Prior Publication Data

US 2016/0092151 A1    Mar. 31, 2016

(30) Foreign Application Priority Data

Sep. 30, 2014 (JP) ................. 2014-200530

(51) Int. Cl.
*G06T 11/20* (2006.01)
*H01J 49/00* (2006.01)

(52) U.S. Cl.
CPC ........ *G06T 11/206* (2013.01); *H01J 49/0036* (2013.01); *G06T 2207/20072* (2013.01)

(58) Field of Classification Search
CPC .......... G06T 11/206; G06T 2207/20072; H01J 49/0036; H01J 49/004; H01J 49/0004
See application file for complete search history.

(56) References Cited

U.S. PATENT DOCUMENTS

2003/0135087 A1* 7/2003 Hickle ............... G06F 19/3406
                                                        600/26
2011/0303842 A1* 12/2011 Nakano ............... G01N 30/72
                                                        250/288

FOREIGN PATENT DOCUMENTS

JP        10-142196 A    5/1998
JP        2001-249114 A  9/2001
(Continued)

OTHER PUBLICATIONS

Office Action dated Oct. 10, 2017, issued in counterpart Japanese Application No. 2014-200530, with English translation. (5 pages).

*Primary Examiner* — Jwalant Amin
(74) *Attorney, Agent, or Firm* — Westerman, Hattori, Daniels & Adrian, LLP

(57) ABSTRACT

A mass spectrometry data processing apparatus having a function of displaying a plurality of $MS^n$ spectra in an arranged manner is allowed to display these $MS^n$ spectra in a state where a user can easily grasp presence or absence of a common neutral loss. A mass spectrometry data processing apparatus 20 that displays, on a display screen, an $MS^n$ spectrum resulting from mass spectrometric analysis of n−1 stage dissociation, where n is integer of two or more, of an ion, includes: a precursor ion identifying section 32 configured to identify, for each of a plurality of $MS^n$ spectra, a mass-to-charge ratios m/z of a precursor ion from which the $MS^n$ spectra are obtained; and a spectrum aligning section 33 configure to display the $MS^n$ spectra on the display screen in a vertically arranged manner such that positions of the mass-to-charge ratios m/z of the respective precursor ions are located at a same horizontal position of the display screen.

10 Claims, 6 Drawing Sheets

(56) References Cited

FOREIGN PATENT DOCUMENTS

| | | | |
|---|---|---|---|
| JP | WO 2009095957 A1 * | 8/2009 | .......... H01J 49/0036 |
| JP | 2012-225862 A | 11/2012 | |
| JP | 2014-75114 A | 4/2014 | |
| WO | 2009/054026 A1 | 4/2009 | |

* cited by examiner

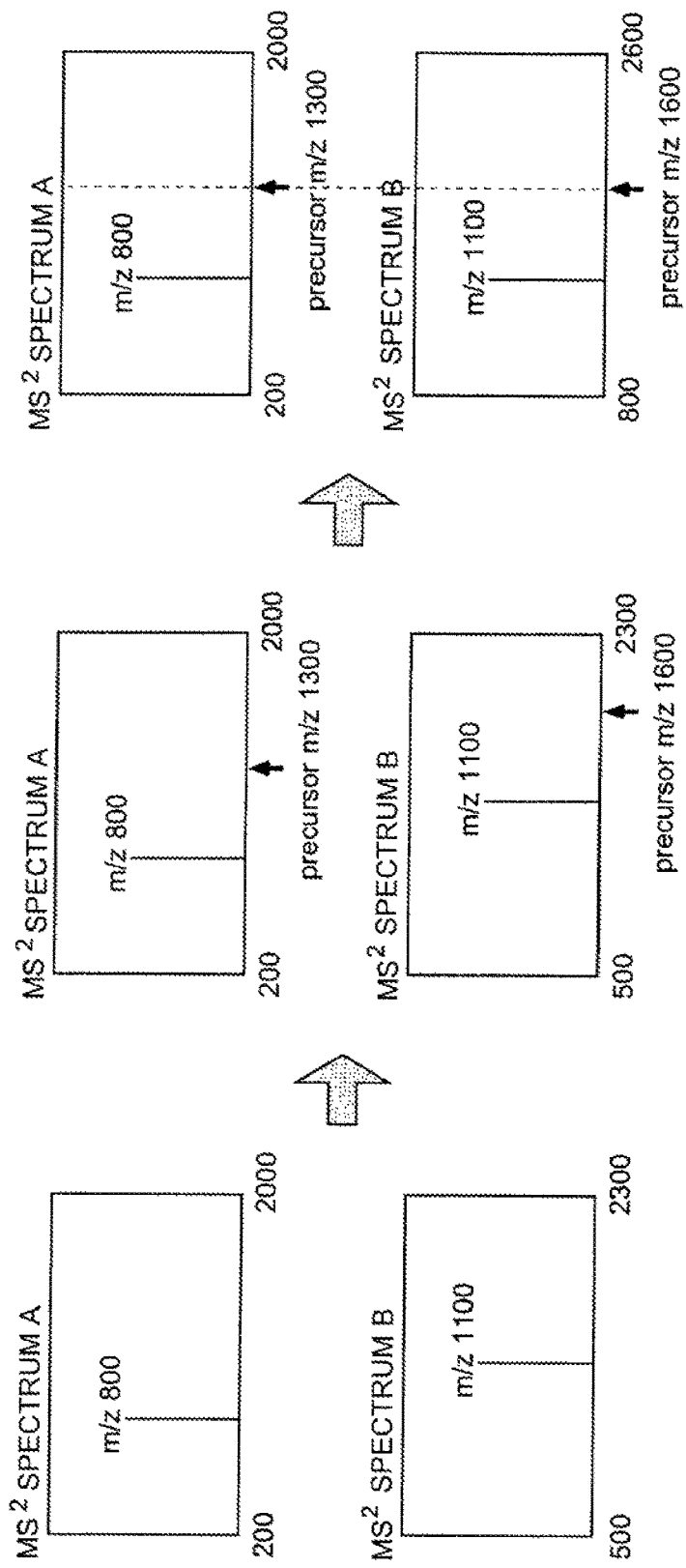

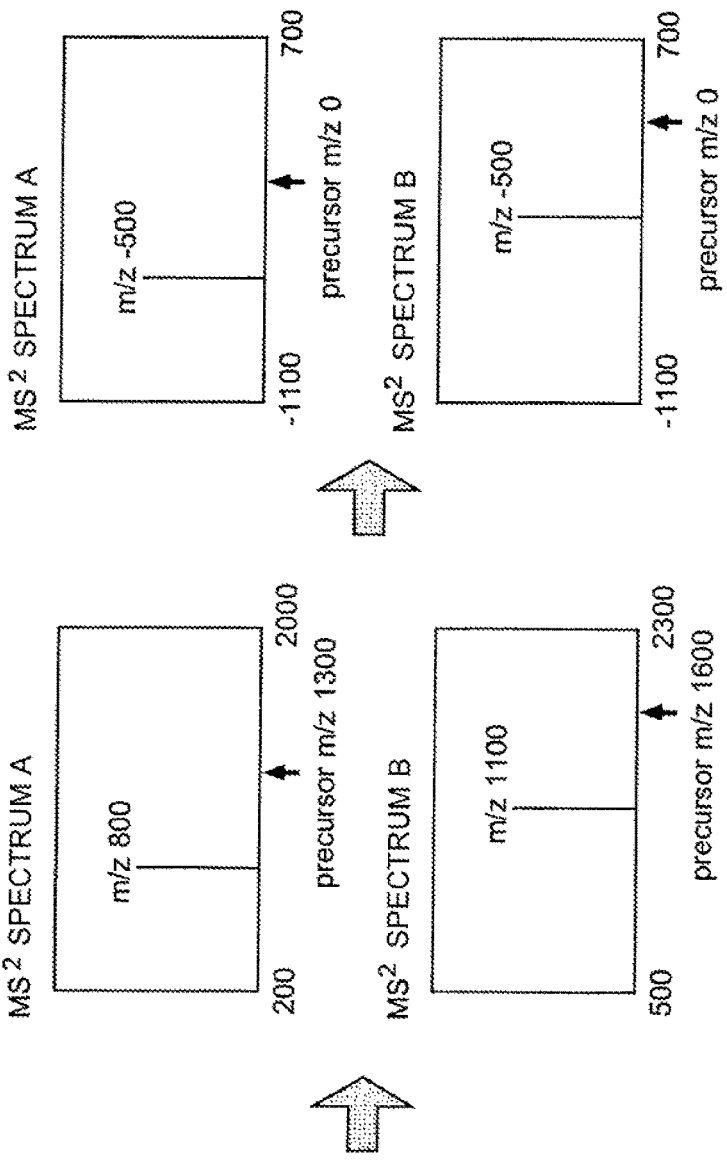
Fig. 5A
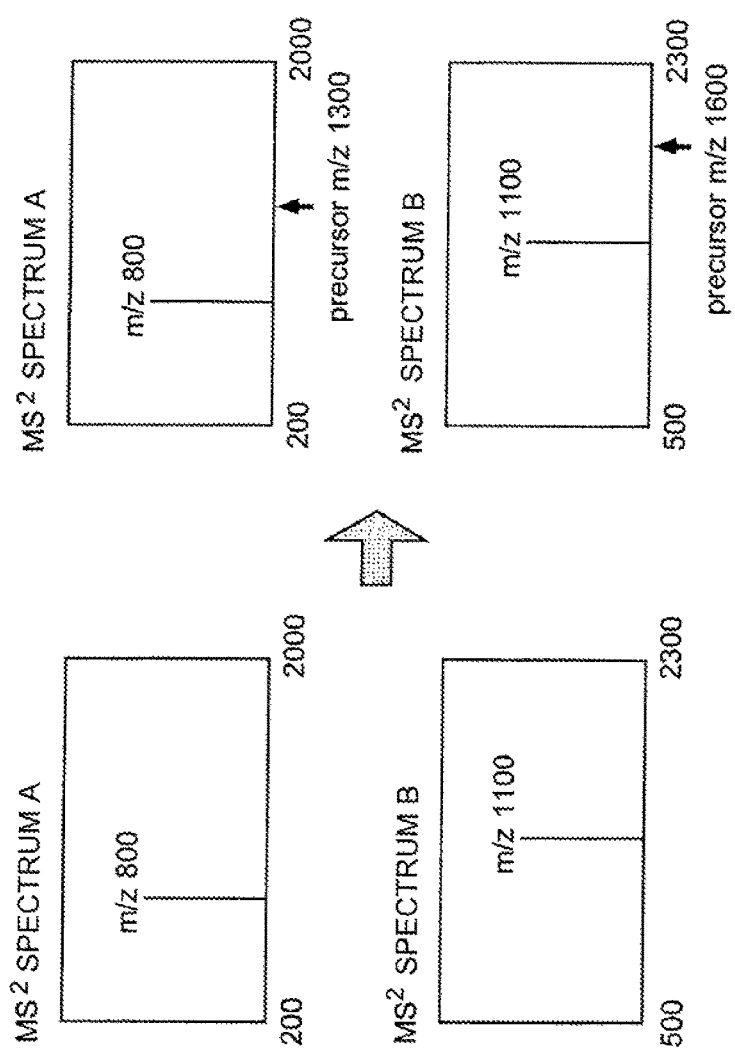
Fig. 5B
Fig. 5C

MASS SPECTROMETRY DATA PROCESSING APPARATUS

TECHNICAL FIELD

The present invention relates to a data processing apparatus for processing data collected using a mass spectrometer capable of MS$^n$ analysis (n is an integer of 2 or larger), and more specifically to a data processing technique related to an image display process of displaying an analysis result.

BACKGROUND ART

One of the well-known mass-analyzing methods using a triple quadrupole mass spectrometer (TQMS) or an ion trap time-of-flight mass spectrometer (IT-TOFMS) is an MS/MS analysis (or tandem analysis). In a general MS/MS analysis, an ion having a specific mass-to-charge ratio (m/z) is first selected as a precursor ion from a substance to be analyzed. Next, the precursor ion thus selected is dissociated into product ions (also referred to as fragment ions) having a small mass-to-charge ratio by a CID (Collision Induced Dissociation) process. The forms of dissociation depend on the structure of an original compound. Accordingly, the composition and chemical structure of a sample molecule can be estimated by conducting a mass spectrometry of various product ions generated by dissociation and creating an MS/MS (=MS$^2$) spectrum.

In recent years, the molecular weight of a substance to be analyzed by such a mass spectrometer tends to become larger and the structure (composition) tends to be more complicated. Accordingly, in some cases depending on a certain property of a substance, the ion of the substance cannot be dissociated to a sufficiently small mass-to-charge ratio with a single-stage dissociating operation. In such cases, the dissociating operations may sometimes be repeated multiple times (n−1 times make an MS$^n$ analysis) and finally produced product ions are mass-analyzed (see e.g., JP H10-142196 A and JP 2001-249114 A). Mass analysis through a single-stage dissociating operation as described above is an MS/MS analysis, or an MS$^2$ analysis. In this description, mass spectrometer capable of MS$^n$ analysis where n is two or larger is referred to as an MS$^n$ mass spectrometer.

In the cases of identifying an unknown substance and of estimating the chemical structure from data (MS$^n$ spectral data) obtained by MS$^n$ analysis, a database is usually searched based on a fragmentation pattern in an MS spectrum (spectrum obtained by mass spectrometric analysis without ion dissociation) and an MS$^n$ spectrum. In the database (sometimes also referred to as a library) used in such cases, various information on various known compounds, that is, compound names, molecular weights, composition formulae, structural formulae, MS$^n$ spectral data, partial structures corresponding to various product ion peaks appearing in MS$^n$ spectra and the like are collected. The databases may be, for example, standard databases, such as NIST, Wiley and Drug, or databases prepared by analytical instrument manufacturers. It may also be constructed by users.

In the database search, among enormous amount of compounds collected in the database, compounds having MS$^n$ spectra that can be considered to match with those having the peak patterns of MS$^n$ spectra derived from a substance to be identified are searched. The retrieved compounds are listed as options. Scores are assigned to respective options according to a degree of matching. The options are normally displayed in the descending order of scores.

FIG. 6A and FIG. 6B are examples of display screens showing search results of database search as described above. In the examples, the upper part of a display screen 60 is a search result list display area 61, and a spectrum display area 62 is provided below. In the search result list display area 61, the registration numbers of MS$^n$ spectra hit in the database search, and the names of compounds from which the spectra are obtained are displayed in a list. In the spectrum display area 62, the MS$^n$ spectrum obtained by analysis of a target sample, and a reference MS$^n$ spectrum are displayed in a vertical comparison. Here, the MS$^n$ spectrum as the comparison reference is one selected by a user from among the MS$^n$ spectra listed in the search result list display area 61.

The mass-to-charge ratio ranges, that is, the minimum values and the maximum values on the abscissa of the spectra, of the MS$^n$ spectrum of the target sample (hereinafter, referred to as a "target spectrum") and of the MS$^n$ spectrum as the comparison reference (hereinafter, referred to as a "comparison reference spectrum") do not match, in general, with each other. For example, in the case of FIG. 6A and FIG. 6B, the mass-to-charge ratio range of the target spectrum 63 is m/z: 0 to 1200 and that of the comparison reference spectrum 64 is m/z: 200 to 800. If these spectra are vertically arranged on the display screen 60 with the same width as shown in FIG. 6A, the abscissa scales of the two spectra do not match. Accordingly, even if the two spectra include peaks having the same m/z (common peaks), it is difficult for a user to grasp the fact at a glance.

To address this, conventional mass spectrometry data processing apparatuses had a function of matching the abscissa scales of the two spectra in such cases. For example, in the aforementioned example, if the user selects "Match on Maximum Width" from among radio buttons provided in a spectrum matching method selection field 65 on the right side of the spectrum display area 62, the target spectrum 63 and the comparison reference spectrum 64 are rearranged so that the abscissa scales are matched with each other as shown in FIG. 6B. Specifically, the mass-to-charge ratio ranges on the abscissa of the two spectra are compared, and their minimum value (m/z: 0 in the example) and maximum value (m/z: 1200 in the example) are detected, which are determined as a target minimum value and a target maximum value, respectively. Subsequently, in conformity with the target minimum value and the target maximum value, the abscissa axis of the target spectrum 63 and/or the abscissa axis of the comparison reference spectrum 64 are extended (in the example, the comparison reference spectrum 64 is extended from a state where the minimum value is m/z: 200 and the maximum value is m/z: 800 to a state where the minimum value is m/z: 0 and the maximum value is m/z: 1200). The two spectra thus adjusted are displayed on the display screen 60 with the same width as shown in FIG. 6B, where the scales of the two spectra match on the abscissa with each other. Consequently, if the target spectrum 63 and the comparison reference spectrum 64 include peaks having the same m/z (common peaks), the common peaks (the peak at m/z: 500 and the peak at m/z: 650 in the example of FIG. 6B) are displayed aligned on a vertical line on the display screen, thereby allowing the user to easily grasp this alignment.

CITATION LIST

Patent Literature

[Patent Literature 1] JP 10-142196 A
[Patent Literature 2] JP 2001-249114 A

SUMMARY OF INVENTION

Technical Problem

In the CID, dissociation of a precursor ion generates, in many cases, not only a product ion but also a neutral molecule, which is also referred to as a neutral loss. When two kinds of precursor ions are dissociated, and neutral losses having the same mass are generated, these precursor ions can be estimated to have a common partial structure. However, the neutral loss does not appear as a peak in the MS$^n$ spectrum. Accordingly, even if the target spectrum and the comparison reference spectrum as described above are displayed in the arranged manner on the display screen, it is difficult for the user to visually grasp presence or absence of a common neutral loss.

The present invention has an object to allow a mass spectrometry data processing apparatus having a function of displaying a plurality of MS$^n$ spectra in an arranged manner to display these MS$^n$ spectra in a state where a user can easily grasp presence or absence of a common neutral loss.

Solution to Problem

A mass spectrometry data processing apparatus according to the first aspect of the present invention achieved to solve the above problem is a mass spectrometry data processing apparatus that displays, on a display screen, an MS$^n$ spectrum resulting from mass spectrometric analysis of n−1 stage dissociation, where n is an integer of two or larger, of an ion, the mass spectrometry data processing apparatus including:

a) a precursor ion identifying section configured to identify, for each of a plurality of MS$^n$ spectra, a mass-to-charge ratio m/z of a precursor ion from which the MS$^n$ spectra is obtained; and b) a spectrum aligning section configured to display the plurality of MS$^n$ spectra on the display screen in a vertically arranged manner such that positions of the mass-to-charge ratios m/z of the respective precursor ions are located at a same horizontal position of the display screen.

Here, in the case where an ion obtained by dissociating a certain ion n−2 times (n is an integer of two or larger) is selected as a precursor ion and then the precursor ion is dissociated one time and mass-analyzed to obtain an MS$^n$ spectrum, the precursor ion is referred to as the "precursor ion from which the MS$^n$ spectrum is obtained" (in the case of n=2, the precursor ion is an ion obtained without dissociation).

In the MS$^n$ spectrum, the difference between the m/z of the precursor ion from which the MS$^2$ spectrum is obtained and the m/z of each peak (the peak of the product ion generated by dissociation of the precursor ion) on the MS$^n$ spectrum corresponds to the mass of the neutral loss generated by the dissociation. Accordingly, the spectrum aligning section allows the MS$^n$ spectra to be displayed so as to align the positions of m/z of the precursor ion with each other in a vertically arranged manner, thereby arranging at least some of the peaks of the MS$^n$ spectra at the same position in the horizontal direction on the display screen in the case with a common neutral loss. Therefore, such configuration allows a user to easily grasp presence or absence of the neutral loss common to the MS$^n$ spectra only with a glance at the MS$^n$ spectra displayed on the display screen.

A specific example is described with reference to two MS$^2$ spectra (an MS$^2$ spectrum A and an MS$^2$ spectrum B) shown in each of FIG. 4A, FIG. 4B and FIG. 4C. In FIG. 4A, the MS$^2$ spectrum A spans a range of m/z: 200 to 2000, and has one peak at a position of m/z: 800. Meanwhile, the MS$^2$ spectrum B spans a range of m/z: 500 to 2300, and has one peak at a position of m/z: 1100. When these peaks are simply displayed in a vertically arranged manner as shown in FIG. 4A, presence or absence of a neutral loss common to the two spectra cannot be grasped at a glance. Hence, the position of m/z (m/z: 1300 in the MS$^2$ spectrum A, and m/z: 1600 in the MS$^2$ spectrum B) of a precursor ion from which the two spectra are obtained is first identified (FIG. 4B) from measurement conditions where the respective MS$^2$ spectra are obtained. Subsequently, the display positions of the MS$^2$ spectrum A and the MS$^2$ spectrum B are adjusted so as to match the positions of the precursor ion in the two spectra with each other in the horizontal direction on the display screen (FIG. 4C). As is apparent from FIG. 4C, according to the adjusted MS$^2$ spectrum A and MS$^2$ spectrum B, it can be understood that each of the peak of m/z: 800 in the MS$^2$ spectrum A and the peak of m/z: 1100 in the MS$^2$ spectrum B appears at a position apart from the position of the precursor ion by the same distance (the same m/z interval). Accordingly, with a glance at such MS$^2$ spectra, the user can easily grasp that both the cases have a common neutral loss.

In the above configuration, arrangement of the peaks indicating the presence of the neutral loss common to the MS$^n$ spectra at the same position in the horizontal direction on the display screen requires not only alignment of the positions of the precursor ions in the two spectra but also matching of the calibration marking spans of m/z on the abscissa axes for the MS$^n$ spectra. For example, in the two MS$^n$ spectra 63 and 64 in FIG. 6A described above, the intervals of calibration markings assigned to the abscissa axes of the spectra have the same dimension on the display screen. However, one calibration marking span represents m/z: 100 in the upper spectrum 63 while one calibration marking span represents m/z: 50 in the lower spectrum 64. In such a case of the spectra, it is difficult for the user to grasp presence or absence of a neutral loss common to the two spectra only by aligning the positions of the precursor ions.

Preferably, the mass spectrometry data processing apparatus according to the present invention further includes c) a spectrum scaling section configured to scale up or down at least one of the MS$^n$ spectra in an abscissa direction so as to match a predetermined range of mass-to-charge ratio m/z in the MS$^n$ spectra in the horizontal direction on the display screen with each other.

Preferably, the mass spectrometry data processing apparatus according to the present invention further includes d) a precursor ion position identifier adding section configured to add position identifiers of the mass-to-charge ratios m/z of the precursor ions to the respective MS$^n$ spectra displayed on the display screen.

A mass spectrometry data processing apparatus invented to achieve the object according to the second aspect is a mass spectrometry data processing apparatus that displays, on a display screen, an MS$^n$ spectrum that is a result of n−1 (n is an integer of two or larger)-stage dissociation of an ion and of mass spectrometric analysis, including:

a) a precursor ion identifying section configured to identify mass-to-charge ratios m/z of precursor ions from which a plurality of MS$^n$ spectra are obtained, for the respective MS$^n$ spectra; and b) an m/z converter section configured to convert m/z values of the mass-to-charge ratio in the MSn spectra into respective relative values with reference to positions of the mass-to-charge ratios m/z of the respective precursor ions.

According to such a configuration, the m/z value of the peak in each MS$^n$ spectrum is converted into a relative value representing the distance from m/z of the precursor ion from which the MS$^n$ spectrum is obtained. Accordingly, if the MS$^n$ spectra have peaks with the same relative value, the peaks are derived from neutral losses having the same mass. The precursor ions from which the MS$^n$ spectra are obtained are estimated to have common partial structures.

A specific example is described with reference to two MS$^2$ spectra (an MS$^2$ spectrum A and an MS$^2$ spectrum B) shown in each of FIG. 5A, FIG. 5B and FIG. 5C. In FIG. 5A, the MS$^2$ spectrum A spans a range of m/z: 200 to 2000, and has one peak at m/z: 800. Meanwhile, the MS$^2$ spectrum B spans a range of m/z: 500 to 2300, and has one peak at m/z: 1100. When these peaks are simply displayed in an arranged manner as shown in FIG. 5A, presence or absence of a neutral loss common to the two spectra cannot be grasped at a glance. Hence, the positions of m/z (m/z: 1300 in the MS$^2$ spectrum A, and m/z: 1600 in the MS$^2$ spectrum B) of precursor ions from which the two spectra are obtained are first identified (FIG. 5B) from measurement conditions where the respective MS$^2$ spectra are obtained. Subsequently, m/z at the positions of precursor ions are calibrated to be zero, and the m/z values in the two spectra are converted (FIG. 5C). According to this conversion, the two relative values of m/z at the peaks in the MS$^n$ spectra A and B are −500. It can be understood that the two peaks are at positions apart from the precursor ions by the same distance (i.e., originating from the same neutral loss). If m/z is displayed not only on the abscissa axis of each MS$^n$ spectrum but also in proximity to the peak (immediately above the peak in the cases of FIG. 5A, FIG. 5B and FIG. 5C) in each spectrum as shown in FIG. 5A, FIG. 5B and FIG. 5C, only one of the values may be converted into a relative value. However, in view of facilitate reading of the mass of a neutral loss, it is preferred to convert both values into relative values.

Also in the second aspect, in order to further facilitate grasping the presence of a common neutral loss, it is preferred to further include c) a spectrum aligning section configured to display the MS$^n$ spectra on the display screen in a vertically arranged manner such that positions of the mass-to-charge ratios m/z of the respective precursor ions identified by the precursor ion identifying section are aligned with a same position in a horizontal direction of the display screen.

Advantageous Effects of Invention

As described above, according to the mass spectrometry data processing apparatuses pertaining to the first aspect and the second aspect, when the MS$^n$ spectra are displayed in an arranged manner, the user can easily grasp presence or absence of neutral losses common to each other.

BRIEF DESCRIPTION OF DRAWINGS

FIG. 2A shows a state before processing. FIG. 2B shows a state after the processing of aligning each spectrum with the position of a precursor ion.

FIG. 4A, FIG. 4B and FIG. 4C are schematic diagrams for illustrating advantageous effects of the first aspect. FIG. 4A shows a state before processing. FIG. 4B shows a state where the positions of precursor ions of the respective spectra are identified. FIG. 4C shows a state where the display is adjusted so as to match the positions of the precursor ions with each other.

FIG. 5A, FIG. 5B and FIG. 5C are schematic diagrams for illustrating advantageous effects of the second aspect. FIG. 5A shows a state before processing. FIG. 5B shows a state where the positions of precursor ions of the respective spectra are identified. FIG. 5C shows a state after processing of converting m/z of the spectra into relative values.

FIG. 6A shows a state before processing. FIG. 6B shows a state after the processing of aligning each width of spectra with the maximum width.

DESCRIPTION OF EMBODIMENTS

Figure 1:
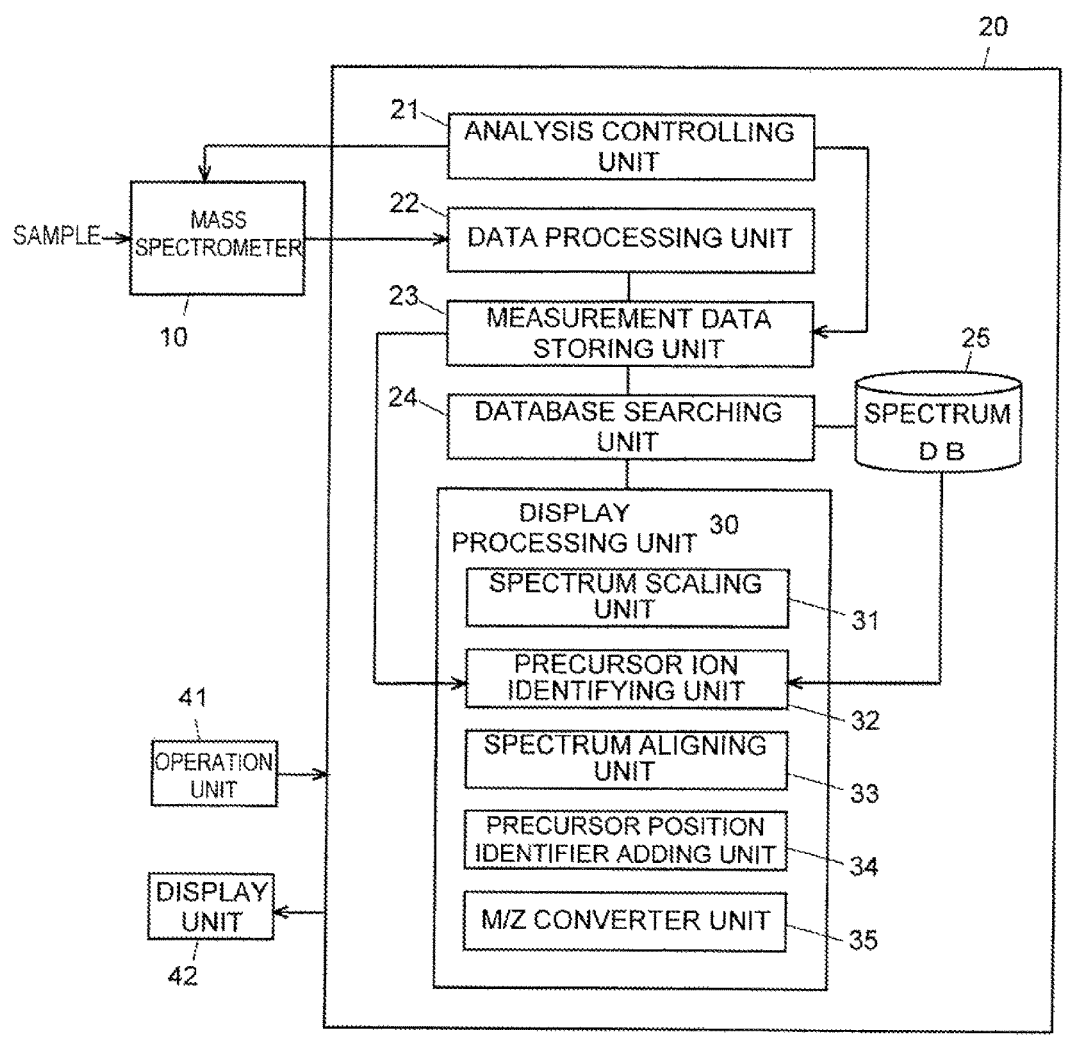
FIG. 1 is a schematic configuration diagram of a mass spectrometer system including a mass spectrometry data processing apparatus according to one embodiment of the present invention.

Hereinafter, embodiments for implementing the present invention are described with reference to the drawings. FIG. 1 is a schematic configuration diagram of a mass spectrometer system including a mass spectrometry data processing apparatus according to one embodiment of the present invention.

The mass spectrometer system includes a mass spectrometer 10 capable of MS$^n$ analysis, and a control processor 20 (corresponding to a mass spectrometry data processing apparatus according to the present invention).

The mass spectrometer 10 may have any configuration as long as the apparatus is capable of MS$^n$ analysis. Thus, any apparatus can be adopted which may be: a triple quadrupole mass spectrometer that dissociates ions by means of CID in a collision chamber and subsequently mass-separates product ions through a quadrupole mass filter; an ion trap mass spectrometer that temporarily receives ions derived from a sample in an ion trap and subsequently performs selection of a precursor ion, CID, and mass separation of the product ions in the ion trap; and an ion trap time-of-flight mass spectrometer that temporarily receives ions derived from a sample in an ion trap, subsequently performs selection of precursor ions and CID in the ion trap, and mass-separates the product ions in a time-of-flight mass spectrometer.

The control processor 20 is made of a general-purpose computer, such as a personal computer or dedicated hardware or a combination of these computer and hardware. This control processor 20 includes: an analysis controlling unit 21 for controlling the operation of the mass spectrometer 10; a data processing unit 22 that generates an MS spectrum or an MS$^n$ spectrum from data obtained by sample measurement through use of the mass spectrometer 10; a measurement data storing unit 23 that stores the MS spectrum or the MS$^n$ spectrum in association with measurement conditions for the sample measurement; a spectrum database (spectrum DB 25); a database searching unit 24 that searches the spectrum DB 25; and a display processing unit 30. The control processor 20 is connected with a monitor (display unit 42)

including an LCD (Liquid Crystal Display), and an operation unit 41 including a pointing device, such as a mouse, and a keyboard.

The display processing unit 30, which is a characteristic configuration element of the present invention, includes, as functional blocks: a spectrum scaling unit 31 (corresponding to a spectrum scaling section according to the present invention); a precursor ion identifying unit 32 (corresponding to a precursor ion identifying section according to the present invention); a spectrum aligning unit 33 (corresponding to a spectrum aligning section according to the present invention); and a precursor position identifier adding unit 34 (corresponding to a precursor position identifier adding section according to the present invention); and an m/z converter unit 35 (corresponding to an m/z converter section according to the present invention). Each of these elements is a functional section basically achieved in a manner of software by a CPU provided in the computer configuring the control processor 20 reading, into memory of the computer, a dedicated program installed in a storage made of a mass storage device, such as an HDD (Hard Disk Drive) or an SSD (Solid State Drive) and executing the program. The dedicated program does not necessarily have a separate configuration. Alternatively, the dedicated program may have, for example, a function embedded in a part of a program for controlling the mass spectrometer 10. The form of the program is not specifically limited.

In the spectrum DB 25, data on various compounds is registered. The data is, for example, compound names, molecular weights, composition formulae, structural formulae, spectral data on each stage of $MS^n$ analysis ($MS^n$ spectral data), partial structures corresponding to various production ion peaks appearing in $MS^n$ spectra, partial structures corresponding to various neutral losses and the like. In this embodiment, the spectrum DB 25 is stored in the control processor 20. The configuration is not limited to that in this embodiment. Alternatively, the spectrum DB 25 may be stored in an external device connected to an interface, not shown, provided in the control processor 20. Alternatively, a configuration may be adopted where the control processor 20 is connected to the Internet via the interface, and a database stored in a server or the like in the Internet is used. As the spectrum DB 25, a standard database, such as NIST, Wiley or Drug, may be used. A database preliminarily prepared by the manufacturer of the mass spectrometer 10, or a database constructed independently by the user through $MS^n$ analysis may be used.

Next, the operations of the mass spectrometer system according to this embodiment are described. Here, identification and structure analysis of an unknown substance X contained in a subject sample (target sample) are exemplified and described.

When analysis is initiated by a user's instruction, the mass spectrometer 10 performs $MS^2$ analysis of the subject sample containing the unknown substance X under control by the analysis controlling unit 21, and the data processing unit 22 creates an $MS^2$ spectrum based on a detected signal obtained by the $MS^2$ analysis. That is, the mass spectrometer 10 first performs MS analysis (mass spectrometric analysis without ion dissociation) of the subject sample, and the data processing unit 22 creates an MS spectrum based on a detected signal obtained by a detector of the mass spectrometer 10 through MS analysis. Subsequently, the data processing unit 22 detects a characteristic peak from among peaks appearing in the MS spectrum, and the mass spectrometer 10 performs $MS^2$ analysis accompanied by a one-stage dissociating operation under control by the analysis controlling unit 21 while setting an ion corresponding to the peak as a precursor ion. The data processing unit 22 then creates an $MS^2$ spectrum based on a detected signal obtained by the $MS^2$ spectrum. The characteristic peak is typically a peak having the maximum signal intensity. However, in the case where interfering components are preliminarily known, peaks derived from such interfering components are omitted and then a peak having the maximum signal intensity may be retrieved.

Here, it is assumed that an ion with m/z: 1000 corresponding to the unknown substance X appearing in the MS spectrum obtained by MS analysis of the subject sample is regarded as a precursor ion to obtain the $MS^2$ spectrum.

The data processing unit 22 collects information on the MS spectrum of the unknown substance X and peak information on each peak on the $MS^2$ spectrum (m/z value and intensity value), and the database searching unit 24 checks the collected information against the spectrum DB 25 to search a substance having a high degree of matching with the peak on the $MS^2$ spectrum from among the known substances registered in the spectrum DB 25 to thereby pick up the substance as an identification candidates. The data processing unit 22 calculates scores representing the accuracy of identification for the respective identification candidates. The display processing unit 30 displays, as a list, the identification candidates in a descending order of scores on the screen of the display unit 42.

Figure 2A:
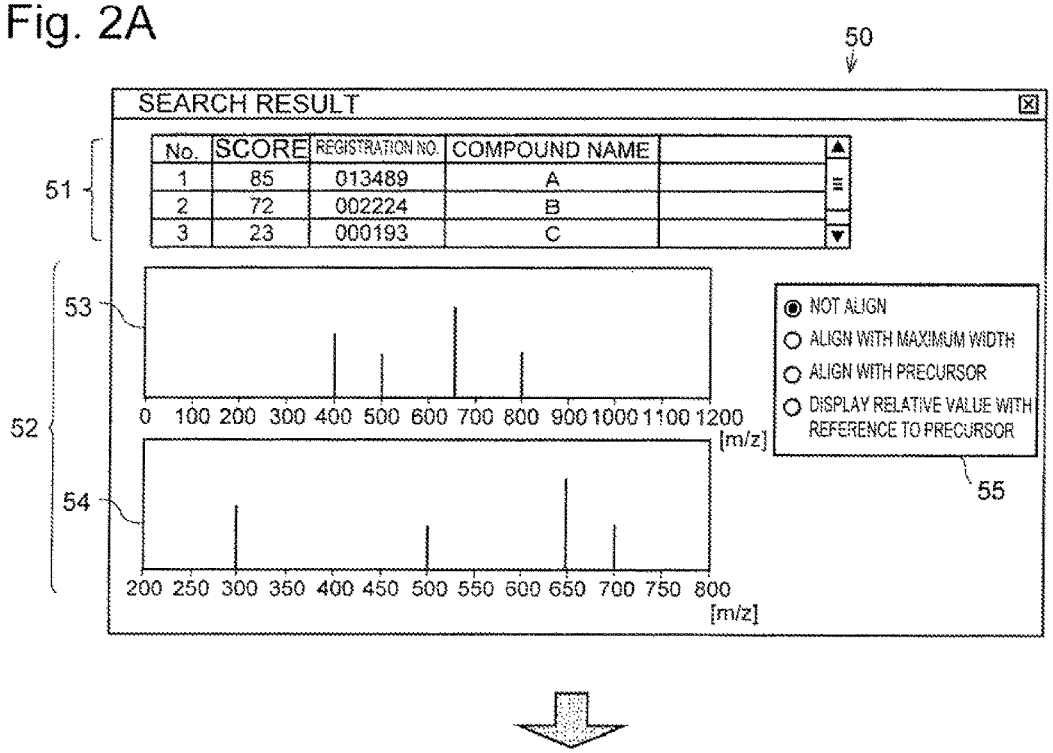
FIG. 2A and FIG. 2B are diagrams showing examples of display screens according to the present invention.

FIG. 2A shows an example of the display screen at this time. In a search result list display area 51 provided in an upper area of an display screen 50, compounds as identification candidates are displayed in a list together with the compound names, the registration numbers in the spectrum DB 25, the scores and the like. In a spectrum display area 52 provided below the area 51, the $MS^2$ spectrum of the unknown substance X is displayed as the target spectrum 53, and the $MS^2$ spectrum of the identification candidate is displayed as a comparison reference spectrum 54 in an arranged manner immediately below a target spectrum 53. As the comparison reference spectrum 54, the $MS^2$ spectrum of the identification candidate displayed at the top of the search result list display area 51 (i.e., the compound having the maximum score) is displayed unless specifically designated. The user can use the operation unit 41 to select any one from among the identification candidates listed in the search result list display area 51, thereby replacing the $MS^2$ spectrum displayed as the comparison reference spectrum 54 with another identification candidate.

Figure 6A:
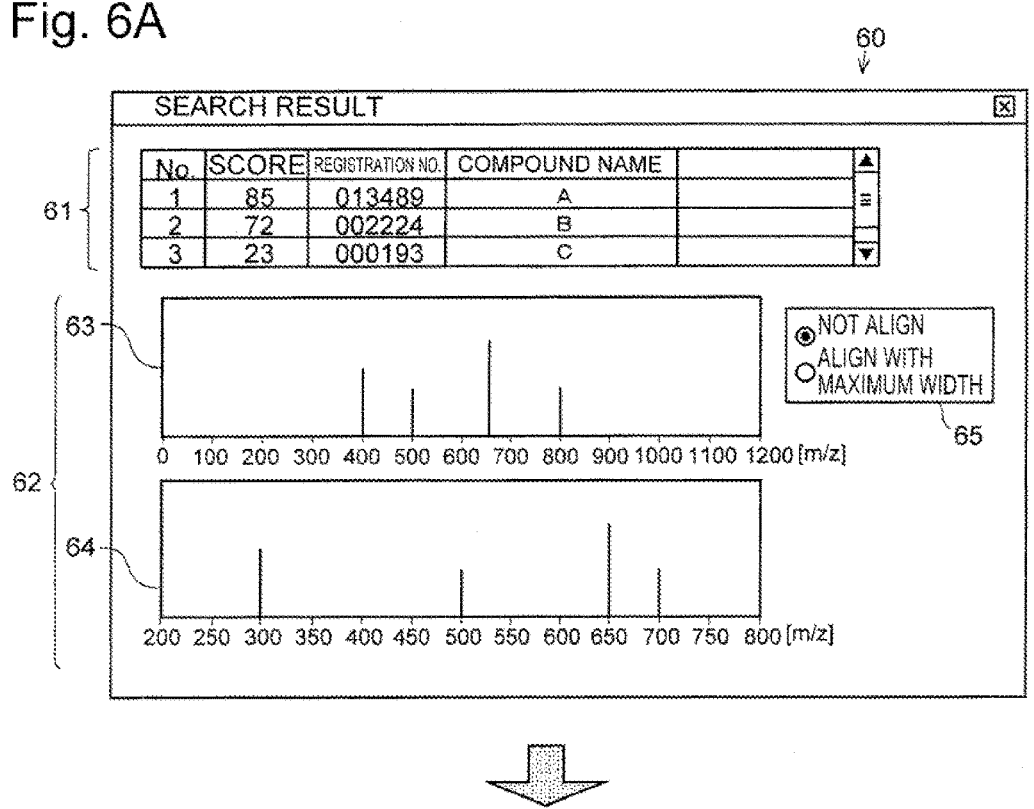
FIG. 6A and FIG. 6B are diagrams showing examples of conventional display screens.

The display screen 50 is similar to the conventional display screen 60, having already been described with reference to shown in FIG. 6A, but is different from the conventional screen in that a spectrum aligning method selection field 55 in the middle of the right in the screen is provided with not only a radio button of "Not Align" and a radio button of "Align With Maximum Width" but also a radio button of "Align With Precursor" and a radio button of "Display Relative Value With Reference to Precursor".

Here, when the user uses the operation unit 41 to select the radio button of "Not Align", the target spectrum 53 and the comparison reference spectrum 54 are vertically arranged without adjustment as shown in FIG. 2A.

Figure 6B:
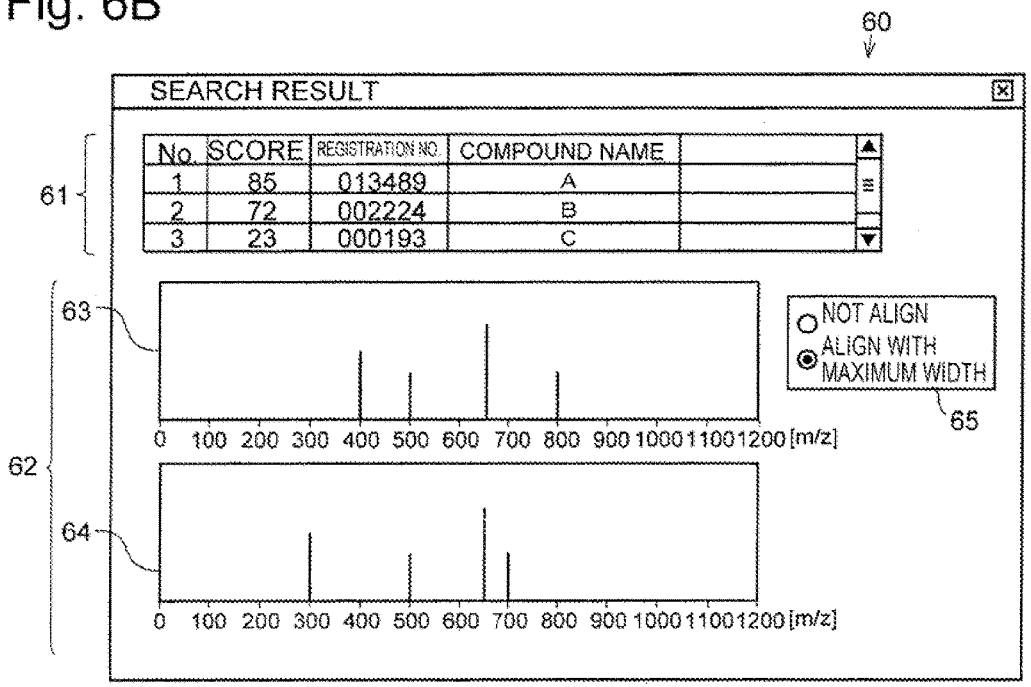

When the radio button of "Align With Maximum Width" is selected, the display processing unit 30 performs a process similar to that described with reference to FIG. 6B, that is, the process of extending widths of the target spectrum 53 and/or the comparison reference spectrum 54 are in the abscissa direction, so as to align the minimum values and the maximum values of the target spectrum 53 and the comparison reference spectrum 54 on the abscissa axis and then displays the spectra on the display screen with the same extended width. Thus, the same mass-to-charge ratios m/z in the target spectrum 53 and the comparison reference spectrum 54 are arranged at the same position in the horizontal direction on the display screen (that is, each spectrum has the same calibration marking values on the abscissa axes), thereby allowing the user to easily grasp presence or absence of peaks (peaks of product ions) having the same m/z in the two spectra.

Figure 2B:
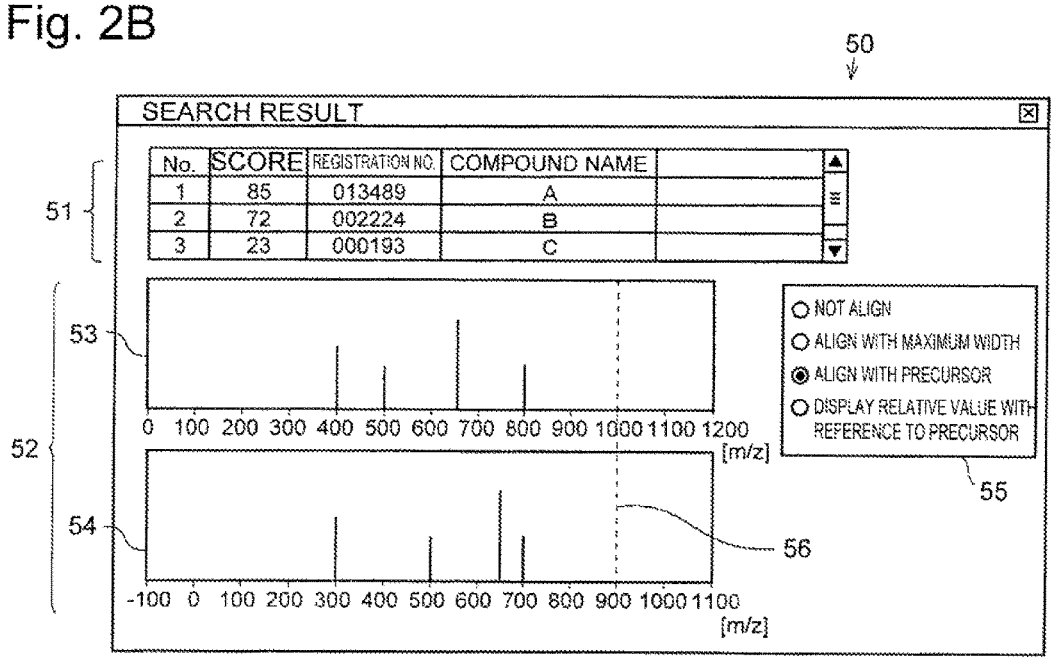

On the other hand, when the radio button of "Align With Precursor" is selected, the spectrum scaling unit 31 first scales up or down the target spectrum 53 and/or the comparison reference spectrum 54 in the abscissa direction to match the calibration marking spans on the abscissa axes for the two spectra. In the example of FIG. 2A, one calibration marking span on the abscissa axis for the target spectrum 53 corresponds to m/z: 100, and one calibration marking span on the abscissa axis for the comparison reference spectrum 54 corresponds to m/z: 50, that is the calibration marking spans of the two spectra do not match. For alignment, the calibration marking span of the abscissa axis for the comparison reference spectrum 54 is scaled down to have ½ length (or the calibration marking span of the abscissa axis for the target spectrum 53 to be doubled in length), so that the calibration marking spans of the two spectra match. If the calibration marking spans of the abscissa axes for the target spectrum 53 and the comparison reference spectrum 54 match from the outset, the process by the spectrum scaling unit 31 is skipped. Subsequently, the precursor ion identifying unit 32 reads, from the measurement data memory unit 23, the m/z value of the precursor ion (i.e., the ion of the unknown substance X) from which the target spectrum 53 is obtained, while reading, from the spectrum DB 25, the m/z value of the precursor ion from which the comparison reference spectrum 54 (i.e., the $MS^2$ spectrum of the identification candidate) is obtained. Here, it is assumed that the precursor ion of the target spectrum 53 has m/z: 1000, the precursor ion of the comparison reference spectrum 54 has m/z: 900. Subsequently, the spectrum aligning unit 33 adjusts the positions of the two spectra so as to arrange the m/z of the precursor ions at the same position in the horizontal direction on the display screen 50 (i.e., m/z: 900 of the comparison reference spectrum 54 is disposed immediately below m/z: 1000 of the target spectrum 53) and newly displays the spectra on the display screen 50. At this time, as shown in FIG. 2B, a broken line (precursor ion line 56) indicating the position of m/z of the precursor ion is added to the target spectrum 53 and the comparison reference spectrum 54. The mark indicating the position of m/z of the precursor ion is not limited to such broken line. Alternatively, the indication may be any of various indications, such as a solid line, an arrow and a symbol.

According to the above processes, if the target spectrum 53 and the comparison reference spectrum 54 have peaks having the same distances from m/z of the precursor ions, the peaks are displayed aligned with a straight line in the vertical direction on the display screen 50. Accordingly, the user can easily grasp presence or absence of a common neutral loss by visually inspecting the two spectra 53 and 54. In the example in FIG. 2B, it can be understood that the peak at m/z: 300 of the comparison reference spectrum 54 is disposed immediately below the peak at m/z: 400 of the target spectrum 53, and the peaks are those related to the neutral loss common to both the spectra (hereinafter, referred to as "peaks related to common neutral loss 'a'"). Furthermore, in the example in FIG. 2B, it can be understood that the peak at m/z: 700 of the comparison reference spectrum 54 is disposed immediately below the peak at m/z: 800 of the target spectrum 53, and the peaks are also those related to the neutral loss common to both the spectra (hereinafter, referred to as "peaks related to common neutral loss 'b'").

Figure 3:
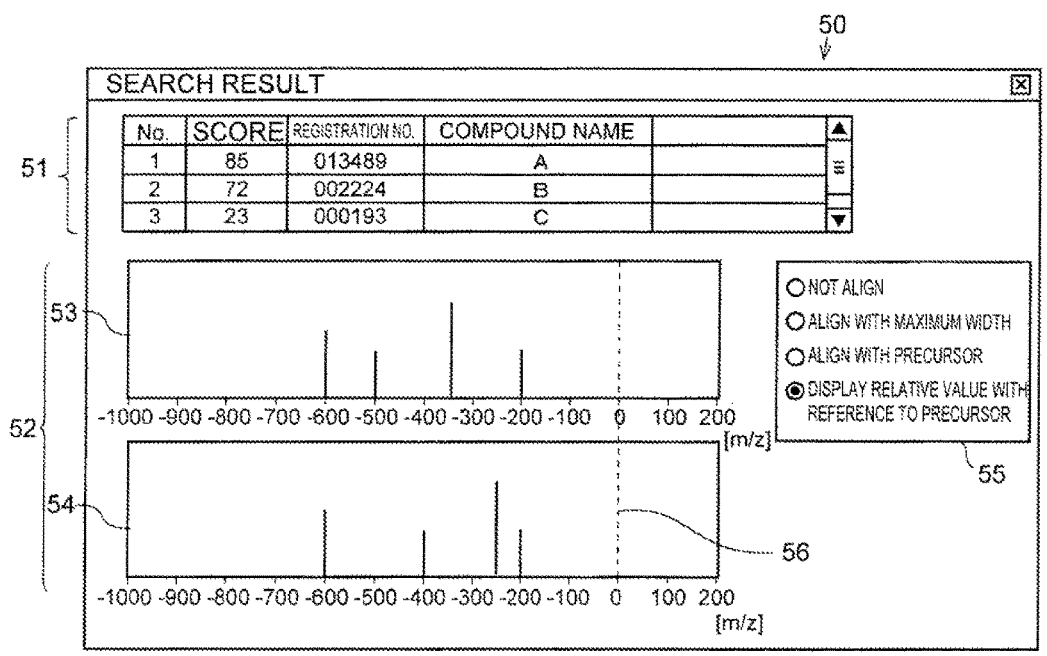
FIG. 3 is a diagram showing another example of a display screen according to the present invention, and shows a state after processing of aligning each spectrum with the position of a precursor and converting m/z into relative values.

When the radio button of "Display Relative Value With Reference to Precursor" is selected, not only a process similar to that of the case of selecting the "Align With Precursor" but also a process of converting m/z values assigned to the calibration markings on the abscissa axes for the spectra 53 and 54 into relative values with reference to m/z of the precursor ion is executed by the m/z converter unit 35. For instance, in the above example, the value "1000" of m/z of the precursor ion in the spectrum of the target spectrum 53 is subtracted from the m/z values assigned to the respective calibration markings on the abscissa axis of the target spectrum 53 before conversion, while the value "900" of m/z of the precursor ion in the spectrum of the comparison reference spectrum 54 is subtracted from the m/z values assigned to the respective calibration markings on the abscissa axis of the comparison reference spectrum 54. The target spectrum 53 and the comparison reference spectrum 54 having calibration markings to which subtracted values are assigned are displayed on the display screen 50 (FIG. 3). Here, the converted m/z value indicates the difference between m/z of the peak (the peak of the product ion) in each $MS^2$ spectrum and m/z of the precursor ion from which the $MS^2$ spectrum is obtained. In the converted m/z value, the mass of the neutral loss generated together with the product ion by dissociation of the precursor ion is reflected. Accordingly, the user can easily grasp of the characteristics of the neutral loss generated by dissociation of the precursor ion from which each spectrum is obtained, by reading the m/z value assigned to each of the converted spectra 53 and 54. For instance, in the example of FIG. 3, the m/z (relative value) of the peak related to the common neutral loss "a" is −600. The m/z (relative value) of the peak related to the common neutral loss "b" is −200. Accordingly, it can be understood that the target spectrum 53 and the comparison reference spectrum 54 have two common neutral losses, which are a neutral loss having a mass of 200 Da and a neutral loss having a mass of 600 Da.

The embodiments for implementing the present invention have been described with reference to the specific examples. The present invention is not limited to the above example. Instead, an appropriate modification is allowed within the scope of the spirit of the present invention. For instance, in the above example, the $MS^2$ spectrum of the unknown substance and the $MS^2$ spectrum of an identification candidate hit in database search are displayed in an arranged manner on the display screen. However, the present invention is not limited to this example. Alternatively, a configuration may be adopted that allows the user to freely select a plurality of $MS^2$ spectra to be displayed on the display screen. The present invention is also applicable to even in the case of displaying three or more $MS^n$ spectra in an arranged manner.

REFERENCE SIGNS LIST

10 . . . Mass Spectrometer
20 . . . Control Processor
21 . . . Analysis Controlling Unit
22 . . . Data Processing Unit
23 . . . Measurement Data Storing Unit 24 . . . Database Searching Unit
25 . . . Spectrum DB
30 . . . Display Processing Unit
31 . . . Spectrum Scaling Unit
32 . . . Precursor Ion Identifying Unit
33 . . . Spectrum Aligning Unit
34 . . . Precursor Position Identifier Adding Unit
35 . . . M/z Converter Unit
41 . . . Operation Unit
42 . . . Display Unit
50, 60 . . . Display Screen
51, 61 . . . Search Result List Display Area
52, 62 . . . Spectrum Display Area
55, 65 . . . Spectrum Aligning Method Selection Field
56 . . . Precursor Line

The invention claimed is:

1. A mass spectrometry data processing apparatus realized by a computer system comprising at least a CPU, a memory and a display that displays, on a display screen, an MS$''$ spectrum resulting from mass spectrometric analysis of n−1 stage dissociation, where n is an integer of two or larger, of an ion, the CPU functioning, by executing a program memorized in the memory, as:
   a) a precursor ion identifying section for reading out from the memory, for each of a plurality of MS$''$ spectra, a mass-to-charge ratio m/z of a precursor ion memorized in relation to the MS$''$ spectrum from which the MS$''$ spectra is obtained; and
   b) a spectrum aligning section for controlling the display so as to display the plurality of MS$''$ spectra on the display screen in a vertically arranged manner such that positions of the mass-to-charge ratios m/z of the respective precursor ions are located at a same horizontal position of the display screen.

2. The mass spectrometry data processing apparatus according to claim 1, wherein the CPU further functions as
   c) a spectrum scaling section for controlling the display so as to scale up or down at least one of the MS$''$ spectra in an abscissa direction so as to match a predetermined range of mass-to-charge ratio m/z in the MS$''$ spectra in the horizontal direction on the display screen with each other.

3. The mass spectrometry data processing apparatus according to claim 2, wherein the CPU further functions as
   d) a precursor ion position identifier adding section for controlling the display so as to add a mark of each position of the mass-to-charge ratios m/z of the precursor ions to the respective MS$''$ spectra displayed on the display screen.

4. The mass spectrometry data processing apparatus according to claim 1, wherein the CPU further functions as
   d) a precursor ion position identifier adding section for controlling the display so as to add a mark of each position of the mass-to-charge ratios m/z of the precursor ions to the respective MS$''$ spectra displayed on the display screen.

5. A mass spectrometry data processing apparatus realized by a computer system comprising at least a CPU, a memory and a display that displays, on a display screen, an MS$''$ spectrum resulting from mass spectrometric analysis of n−1 stage dissociation, where n is integer of two or more, of an ion, the CPU functioning, by executing a program memorized in the memory, as:
   a) a precursor ion identifying section for reading out from the memory, for each of a plurality of MS$''$ spectra, a mass-to-charge ratio m/z of a precursor ion from which the MS$''$ spectra is obtained;
   b) an m/z converter section for converting m/z values of the mass-to-charge ratio in the respective MS$''$ spectra into respective relative values with reference to positions of the mass-to-charge ratios m/z of the respective precursor ions, and controlling the display so as to display the relative values on the plurality of MS$''$ spectra;
   c) a spectrum aligning section for controlling the display so as to display the MS$''$ spectra on the display screen in a vertically arranged manner such that positions of the mass-to-charge ratios m/z of the respective precursor ions identified by the precursor ion identifying section are located at a same horizontal position of the display screen; and
   d) a selection section for allowing a user, when the plurality of MS$''$ spectra are displayed on the display screen by the spectrum aligning section, to select whether a conversion by the m/z converter section is performed or not.

6. A non-transitory computer readable medium recording a program for causing a computer to function as each of the sections of the mass spectrometry data processing apparatus according to claim 1.

7. A non-transitory computer readable medium recording a program for causing a computer to function as each of the sections of the mass spectrometry data processing apparatus according to claim 2.

8. A non-transitory computer readable medium recording a program for causing a computer to function as each of the sections of the mass spectrometry data processing apparatus according to claim 3.

9. A non-transitory computer readable medium recording a program for causing a computer to function as each of the sections of the mass spectrometry data processing apparatus according to claim 4.

10. A non-transitory computer readable medium recording a program for causing a computer to function as each of the sections of the mass spectrometry data processing apparatus according to claim 5.

* * * * *